United States Patent [19]

Benz

[11] 4,103,576

[45] Aug. 1, 1978

[54] FLYING CROSS CUTTING SHEAR FOR PLATE

[75] Inventor: Willi Benz, Neuss, Fed. Rep. of Germany

[73] Assignee: Schloemann-Siemag Aktiengesellschaft, Dusseldorf, Fed. Rep. of Germany

[21] Appl. No.: 769,683

[22] Filed: Feb. 17, 1977

[30] Foreign Application Priority Data

Mar. 20, 1976 [DE] Fed. Rep. of Germany ....... 2611988

[51] Int. Cl.² .............................................. B26D 1/56
[52] U.S. Cl. ....................................... 83/320; 83/628; 83/635; 83/328
[58] Field of Search ................. 83/318, 320, 328, 627, 83/628, 632, 635

[56] References Cited

U.S. PATENT DOCUMENTS

| | | | |
|---|---|---|---|
| 3,211,037 | 10/1965 | Diolot | 83/320 |
| 3,581,616 | 6/1971 | Kawae et al. | 83/320 |
| 3,811,354 | 5/1974 | Ito | 83/320 |

*Primary Examiner*—Donald R. Schran
*Attorney, Agent, or Firm*—Holman & Stern

[57] ABSTRACT

A cross-cutting shear of the type where the nip formed between the blades travels in the direction of movement of the material being sheared is driven by a single crankshaft. The upper blade is attached to the crank portion of the crankshaft, and the sliding motion of the blade-carrying carriage is provided by cam discs mounted on the crankshaft and acting against rollers in a stationary frame. The crankshaft is journalled at each end in links pivotally attached to the bottom part of the blade carriage. The guide links are free to pivot independently of the blade carriage. By this construction, reaction loadings are prevented from being transmitted through to the stationary housing, when a shearing action is taking place.

6 Claims, 6 Drawing Figures

FLYING CROSS CUTTING SHEAR FOR PLATE

FIELD OF THE INVENTION

This invention relates to flying cross cutting shears for plate comprising blade carriers moved in the cutting direction, and a blade carriage guided on guides provided on the stationary shears frame, in synchronism with the conveyed plate, by cam discs fixed on the crankshaft.

BACKGROUND OF THE INVENTION

Shears are known for cross-cutting continuously conveyed plate, the blade carriages of which are moved during the cutting process in synchronism with the plate. In these shears, pressure cylinders, rack and pinion assemblies, crank assemblies and cam discs are provided for moving the blade carriage.

As the loading phases for the cutting and sliding drive are staggered in time, in the case of known shears a common drive is provided such that the cutting drive is obtained from a drive shaft by way of cranks and the sliding drive for the blade carriage is obtained through cam discs fixed on the drive shaft and levers provided with rollers. These shears have the disadvantage that the cutting force is absorbed by the blade carriage guides, so leading to a considerable increase in the required sliding force. A further disadvantage is the fact that costly transmission levers are required for sliding the blade carriage (German Offenlegungsschrift No. 2129589).

The disadvantage of known shears should be avoided by the invention. The object of the invention is in particular to provide a flying shear with cam discs fixed on the crankshaft for moving the blade carriage, whereby the blade carriage guide remains free from the cutting force. A further object is to dispense with transmission levers for moving the blade carriage.

SUMMARY OF THE INVENTION

According to the invention this is attained in that the crankshaft is pivoted to swivel in guide links supported on the blade carriage, rollers supported on the shear frame in the swivel direction are associated with the cam discs, and the cranks of the crankshaft are supported in the blade carrier mobile in the cutting direction.

In this manner, the cutting force remains within the cutting unit and does not extend through the blade carriage guide into the stationary shear frame. Transmission levers are not required. The cam discs may comprise a smaller lift than in the case of known shears, as a supplementary movement component for the blade carriage is produced by the cranks.

According to a further characteristic of the invention, for stationary cutting the blade carriage is fixable in an end position. This may be advantageously attained by a locking device associated with the blade carriage. In this manner change-over from stationary to flying operation is possible without loss of time.

In the case of a shear comprising cam discs for both directions of movement of the blade carriage, the rollers disposed in one direction of motion may be made removable from the lifting range of the associated cam discs.

Pressure cylinders may advantageously act between the stationary shear frame and blade carriage instead of the cam discs provided for one direction of movement.

In a further development of the invention, the crankshaft is connected laterally to the drive shaft of a shear transmission, the housing of the shear being supported on the stationary shear frame in the region of the drive shaft by way of a mobile moment support. In this manner, the swivel movement of the crankshaft is substantially compensated by a corresponding swivel movement of the transmission housing, so that short link shafts may be inserted between the motor and transmission.

BRIEF DESCRIPTION OF THE DRAWINGS

Two embodiments of the invention are illustrated in the drawing, in which.

DESCRIPTION OF THE PREFERRED EMBODIMENTS

Figure 1:
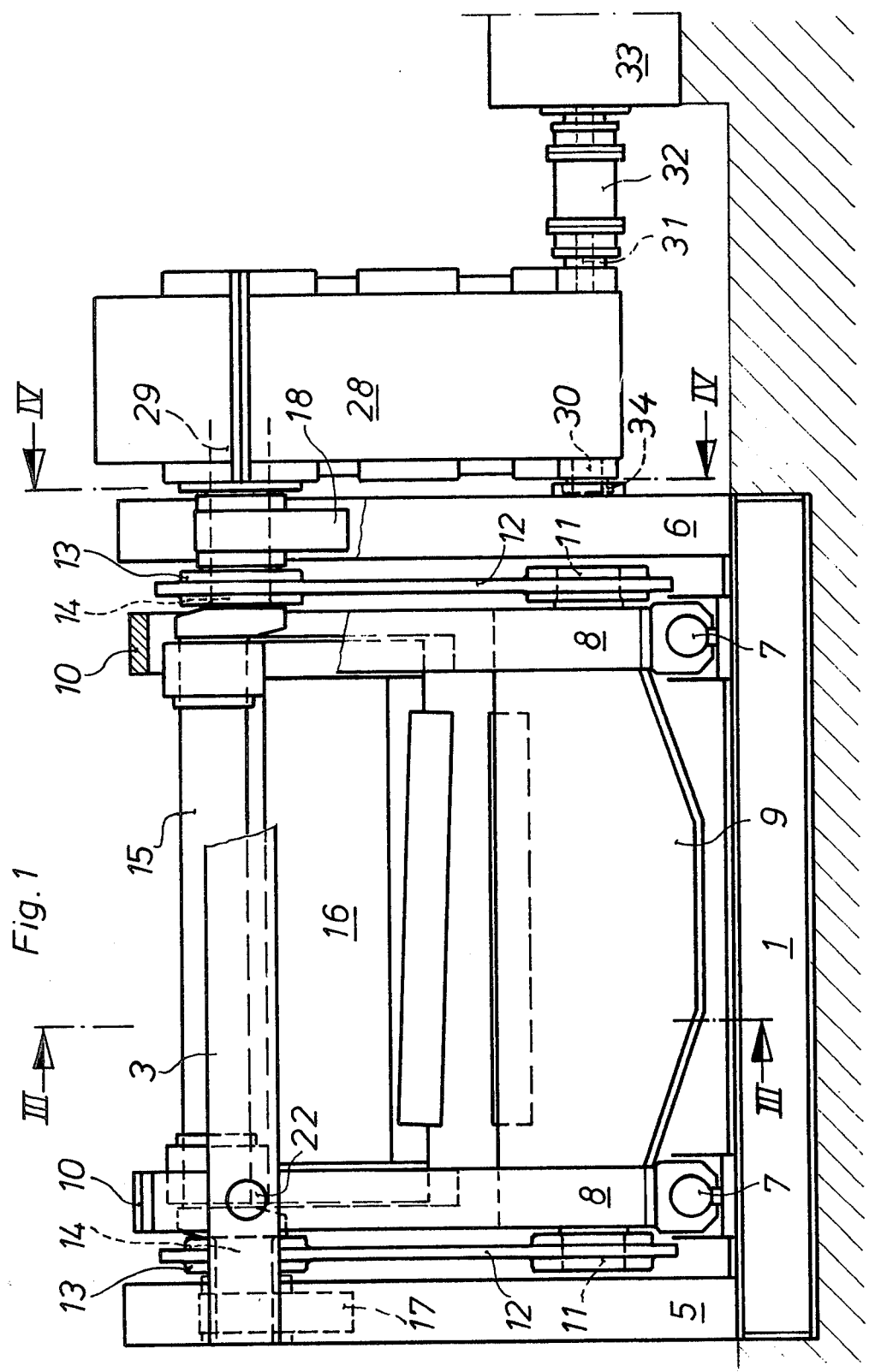
FIG. 1 is a view of a flying shear in the plate conveying direction.
Figure 2:
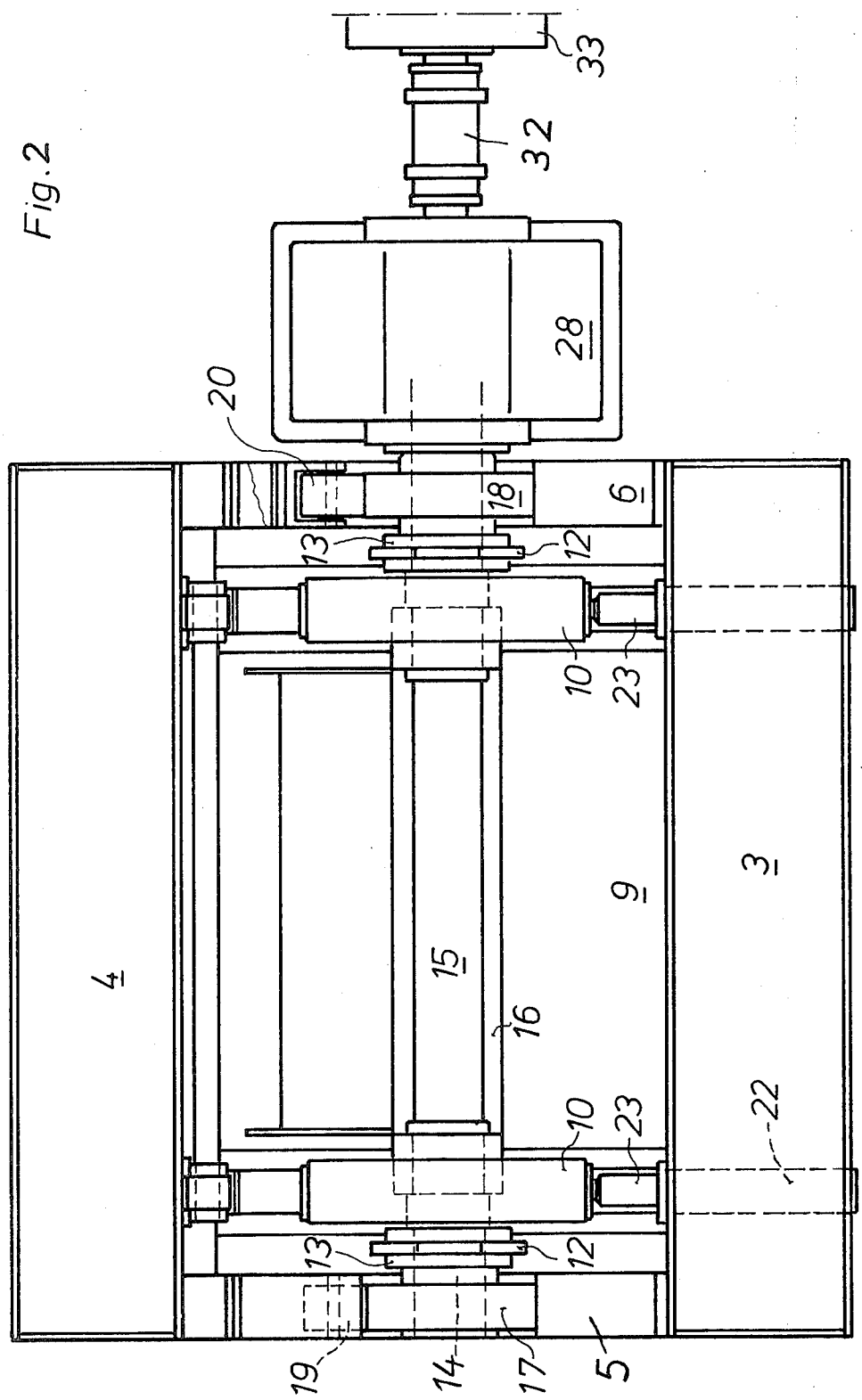
FIG. 2 is a plan view of the shear.
Figure 3:
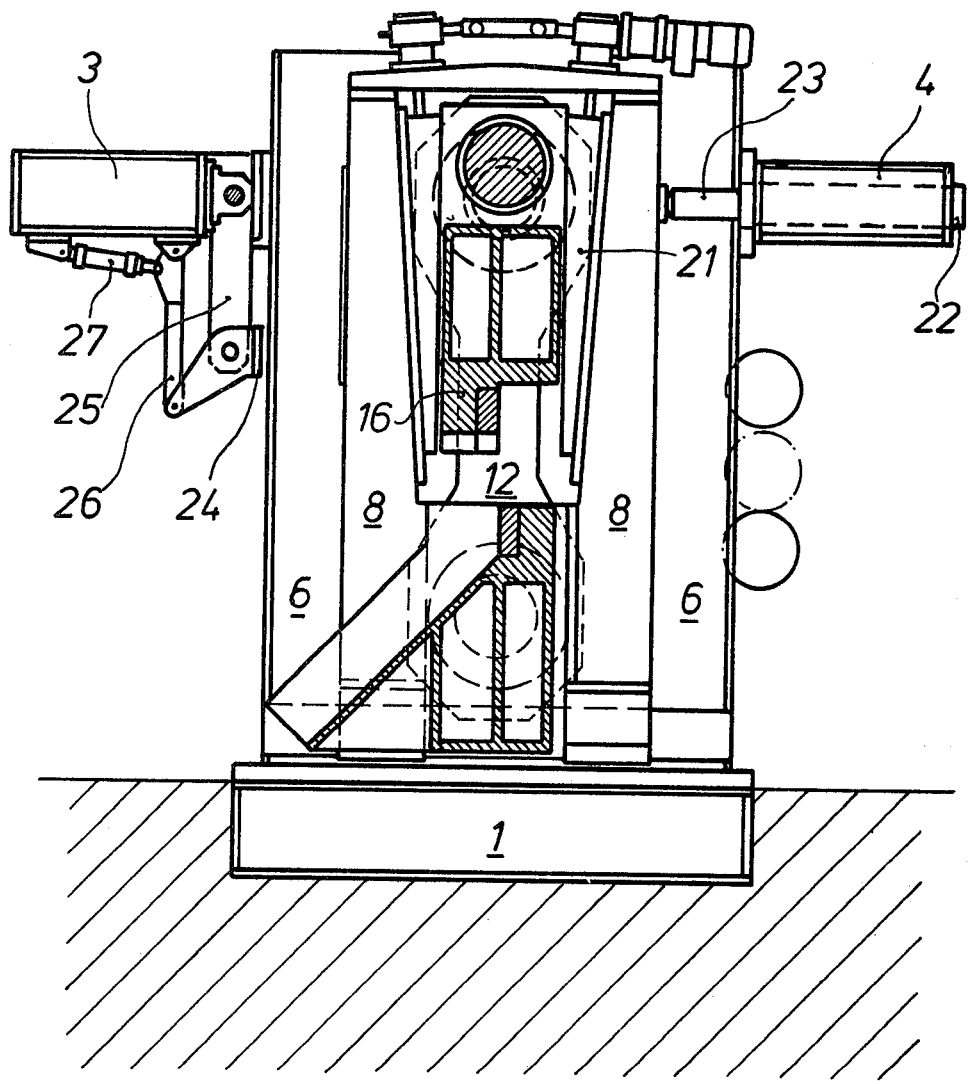
FIG. 3 is a section on the line III—III of FIG. 1.
Figure 4:
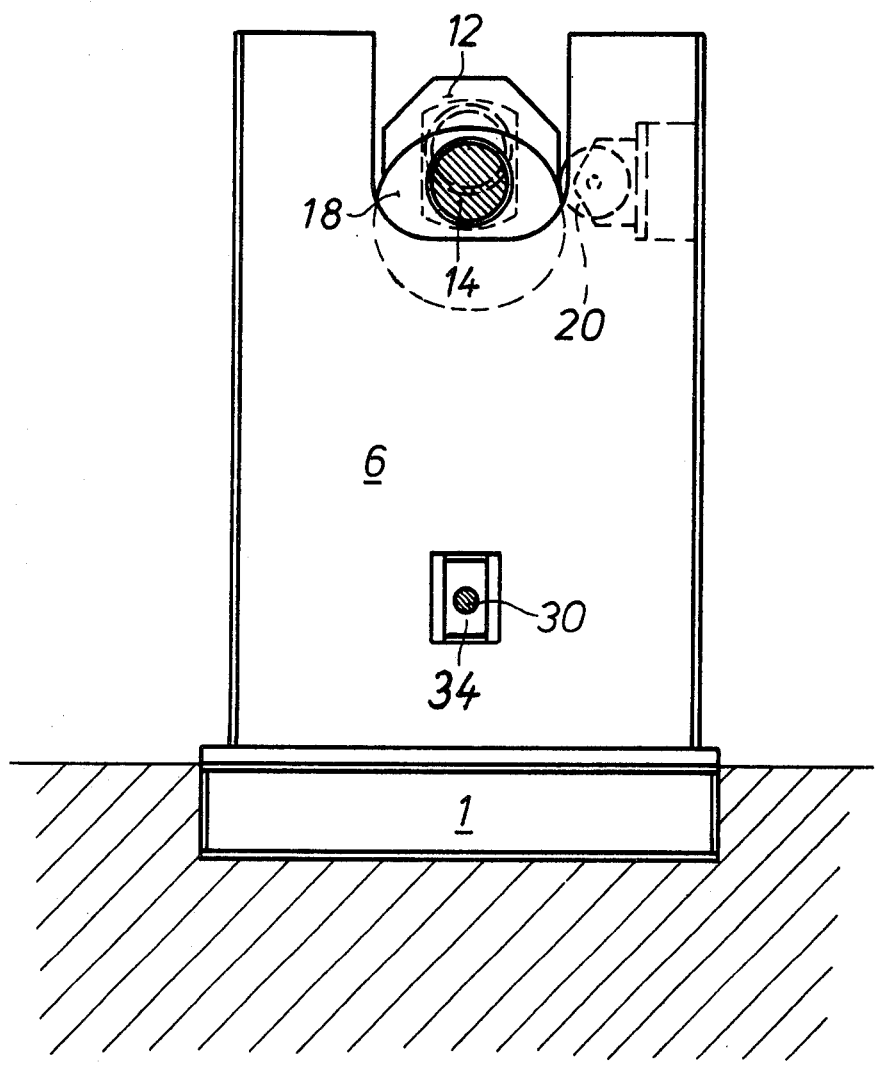
FIG. 4 is a partial section on the line IV—IV of FIG. 1.

In the case of the flying cross cutting shear illustrated in FIGS. 1 to 4, a frame consisting of a baseplate 1 and two side supports 5, 6 joined together by cross members 3, 4 is anchored to the foundation. Guides 7 extending parallel to the plate conveying direction are fixed on the baseplate 1. Side walls 8 of the blade carriage are slidably supported on the guides. The side walls 8 are joined together in their lower region by a lower blade carrier 9 and at their top by a head beam 10.

Pivots 11 are disposed on the outside of the side walls 8 of the blade carriage, and on which guide links 12 are supported. In an opening at their upper end, the links 12 support bearings 13 of a crankshaft 14, the crank 15 of which is supported in an upper blade carrier 16 guided between the side walls 8. The crankshaft 14 extends into the region of a recess in the side supports 5, 6 of the stationary frame. Respective cam discs 17, 18, with which support rollers 19, 20 supported on the side supports 5, 6 are associated, are fixed on the crankshaft 14 in this region. On turning the crankshaft 14, the horizontal position of the crankshaft 14 is determined within the guide formed by the guide links 12 by the cam discs 17, 18 rolling on the stationary rollers 19, 20.

The movement of the crankshaft 14 is transmitted by way of the crank 15 to the upper blade carrier 16, and from here by way of the guides 21 to the side walls 8 and the lower blade carrier 9. A further component of movement is superimposed on the movement of the blade carriage 8, 9 on the guides 7 corresponding to the lift of the cam discs 17, 18 by the turning of the crank 15. By this means a constant movement of the blade carriage 8, 9 in the cutting direction is obtained for a constant speed of the motor 33.

In the embodiment of FIGS. 1 to 4, the sliding of the blade carriage 8, 9 in the conveying direction is effected by pressure cylinders disposed on the cross member 4, their piston rods 23 acting on the side walls 8 of the blade carriage. The backward movement of the blade carriage 8, 9 is effected by the cam discs 17, 18 against the cylinder force. A reverse arrangement is obviously possible.

Parallel links 25, 26 on which stops 24 are disposed, are supported on the cross member 3 lying opposite the pressure cylinders 22. For stationary cutting, the stops may be swivelled by cylinders 27 into the sliding range of the blade carriage side walls 8, so that the blade carriage is stopped in an end position. Transfer from stationary to flying operation is effected by switching over the cylinder 27 to withdrawal while still under stationary operation. On doing this, the parallelogram is maintained in its swung-in state by the friction contact produced by the cylinder 22 pressing through the blade carriage. Only on contact between the cam discs 17, 18 and the rollers 19, 20 is the friction contact between the stop surfaces 24 and the blade carriage side walls 8 lifted by a small amount, whereby the link parallelogram 25, 26 is freed to swing outwards, with transfer to flying operation without loss of time.

A transmission 28 is disposed on the outside of the side supports 6, its drive shaft 29 being connected to the crankshaft 14. To form a moment support, the transmission housing 28 is connected through a slide block 34 and a journal 30 to the lower part of the side support 6, in such a manner that the transmission 28 can follow the swivel motion of the crankshaft 14. By disposing a drive shaft 31 for the transmission in the region of the moment support 30, 34, the transmission housing 28 compensates for the swivel motion of the crankshaft 14, so that the drive shaft 31 may be connected through a short link shaft 32 to a motor 33.

Figure 5:
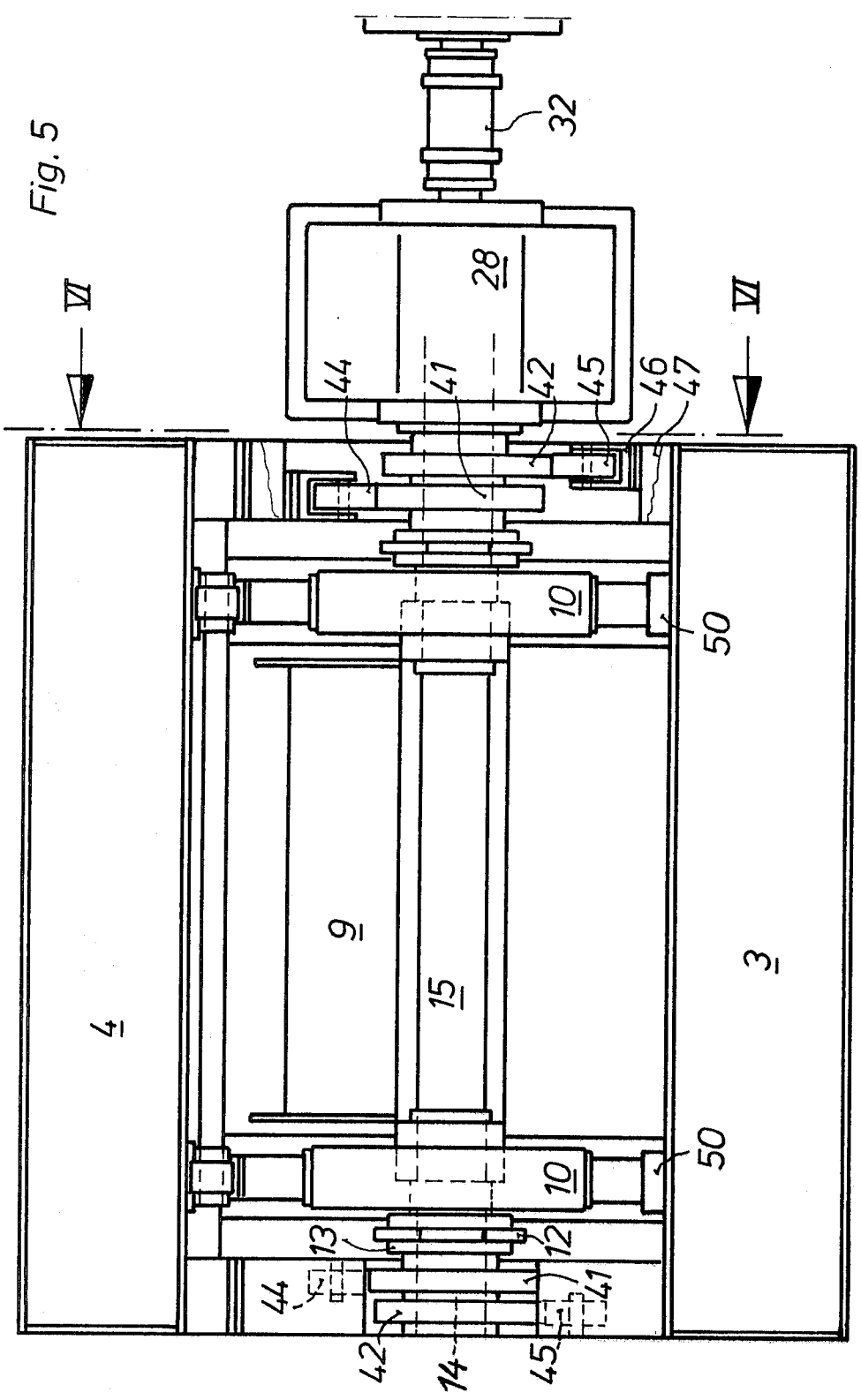
FIG. 5 is a plan view of a second embodiment of flying shear with cam discs for both directions of movement.
Figure 6:
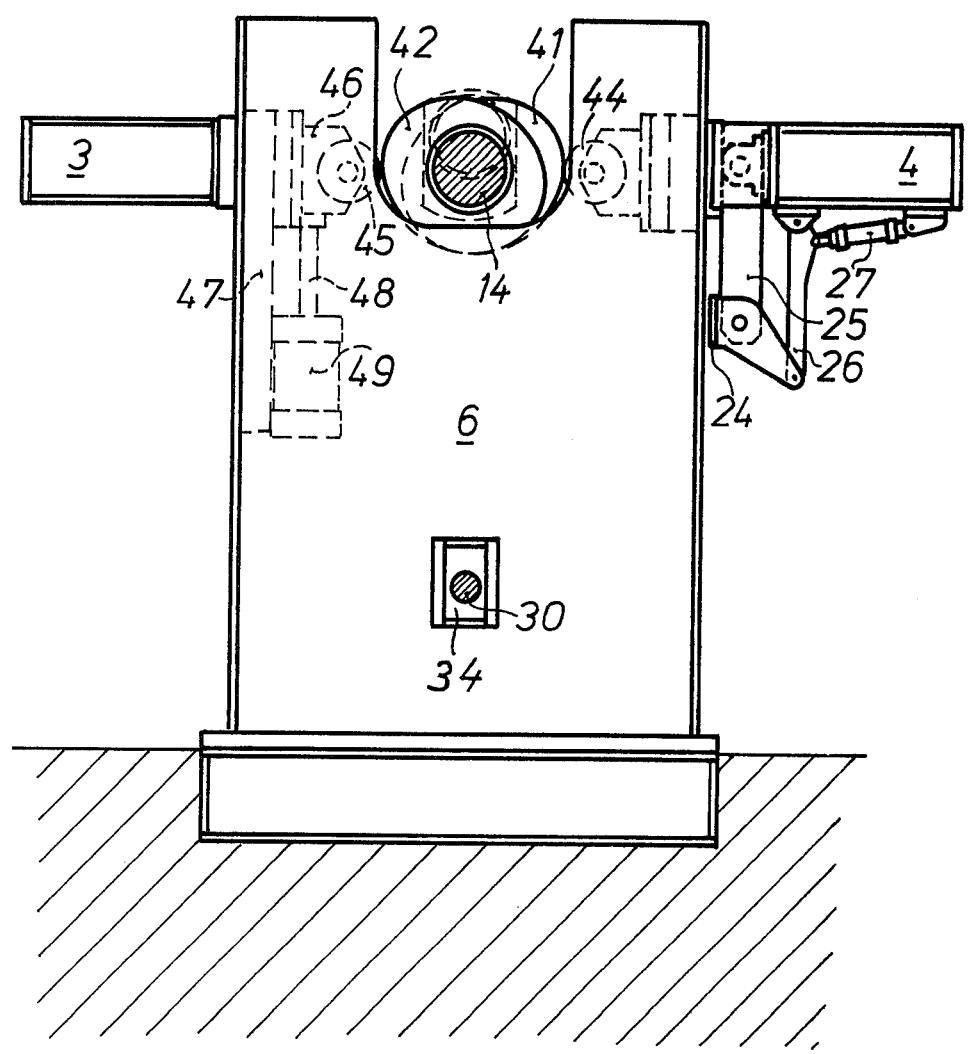
FIG. 6 is a partial section on the line VI—VI of FIG. 5.

The cross cutting shear shown in FIGS. 5 and 6 corresponds in its basic construction to the shear shown in FIGS. 1 to 4. The corresponding structural elements are therefore given the same reference numerals. In contrast to the first embodiment, in this case pairs of cam discs 41, 42 are disposed on the crankshaft 14 for both directions of movement of the blade carriage 8, 9, 10. Rollers 44, supported fixed on the side supports 5, 6, are associated with the cam discs 41. Rollers 45 are associated with the cam discs 42, their bearing blocks 46 being guided on vertical guides 47 provided on the side supports 5, 6 and being connected to the piston rods 48 of cylinders 49.

For stationary cutting, the rollers 45 are removed from the lifting range of the cam discs 42 by the cylinders 49. The blade carriage now stops in an end position which is determined on the one hand by sprung arm brackets 50 disposed on the cross member 3 and on the other hand by the maximum lift of the cam discs 41. For fixing the blade carriage 8, 9, 10, stops disposed on a link parallelogram 25, 26 are also swung in this case by cylinders 27 against the blade carriage side walls 8.

To transfer from stationary to flying operation, the cylinders are again in this case switched over to withdrawal while stationary operation is still in effect. In this manner the stops 24 are initially maintained in their position by the sprung arm brackets 50 acting on the blade carriage side walls 8. Only on contact between the cam discs and the rollers 45 are the stops 24 freed to swing outwards, to make immediate transfer to flying operation possible.

I claim:

1. Flying cross-cutting shear for cutting a moving strip, comprising
   a stationary frame,
   guides on the frame,
   a blade carriage guided on the guides,
   a pair of opposite blade carriers mounted in the blade carriage and movable therewith in the direction of movement of the strip,
   blades mounted in each of the carriers,
   a crankshaft for moving one of the blade carriers towards and away from the plane of the strip to carry out cutting actions,
   bearing means in the stationary frame,
   cam discs mounted at ends of the crankshaft and contacting the bearing means so as to guide the blade carriage, when the crankshaft turns, in the direction of movement of the strip at the same time as the crankshaft is moving said one of the blade carriers to cut the strip, and guide links, supported on the blade carriage, in which the crankshaft is journalled.

2. The shear of claim 1, including means for fixing the blade carriage in an end position.

3. The shear of claim 2, including a locking device associated with the blade carriage.

4. The shear of claim 1, wherein the bearing means comprises rollers with their axes parallel to the crankshaft axis, and the rollers can be withdrawn from their position in the stationary frame where they are within the range of the cam discs.

5. The shear of claim 1, including a pressure cylinder which acts between the stationary shears frame and the blade carriage to control the horizontal movement of the carriage on one side.

6. The shears of claim 1, wherein the crankshaft is driven by a drive shaft via a transmission, and the housing of the transmission is supported on the stationary shears frame by a movable mounting in the region of the drive shaft.

* * * * *